United States Patent
Stark, Jr. et al.

(10) Patent No.: US 10,959,111 B2
(45) Date of Patent: Mar. 23, 2021

(54) VIRTUAL REALITY BEAMFORMING

(71) Applicant: Advanced Micro Devices, Inc., Santa Clara, CA (US)

(72) Inventors: David Robert Stark, Jr., New Braunfels, TX (US); John Zhong-Chen Li, Glen Waverley (AU); Carson Ryley Reece Green, Austin, TX (US); Victor Selvaraj, Leander, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/289,232

(22) Filed: Feb. 28, 2019

(65) Prior Publication Data

US 2020/0280862 A1 Sep. 3, 2020

(51) Int. Cl.
*H04W 16/28* (2009.01)
*H04W 24/02* (2009.01)
*H04W 24/08* (2009.01)
H04B 7/0491 (2017.01)

(52) U.S. Cl.
CPC ............ *H04W 16/28* (2013.01); *H04W 24/02* (2013.01); *H04W 24/08* (2013.01); *H04B 7/0491* (2013.01)

(58) Field of Classification Search
CPC combination set(s) only.
See application file for complete search history.

(56) References Cited

U.S. PATENT DOCUMENTS

| | | | |
|---|---|---|---|
| 5,818,543 A | 10/1998 | Lee | |
| 5,860,056 A | 1/1999 | Pond | |
| 6,414,960 B1 | 7/2002 | Kuhn et al. | |
| 7,479,981 B2 | 1/2009 | Tierney et al. | |
| 7,715,634 B2 | 5/2010 | Lei et al. | |
| 7,881,258 B2 | 2/2011 | Gilbert et al. | |

(Continued)

FOREIGN PATENT DOCUMENTS

| | | |
|---|---|---|
| WO | 2009156366 A1 | 12/2009 |
| WO | 2011087905 A1 | 7/2011 |

OTHER PUBLICATIONS

Non-Final Office Action in U.S. Appl. No. 15/686,927, dated Nov. 1, 2017, 16 pages.
Final Office Action in U.S. Appl. No. 15/686,927, dated Feb. 27, 2018, 15 pages.

(Continued)

*Primary Examiner* — Junpeng Chen
(74) *Attorney, Agent, or Firm* — Kowert Hood Munyon Rankin and Goetzel PC; Rory D. Rankin

(57) ABSTRACT

Systems, apparatuses, and methods for implementing enhanced beamforming training procedures are disclosed. A system includes a transmitter communicating over a wireless link with a receiver. To maintain a high quality of transmission over the wireless link, the transmitter and receiver perform periodic beamforming training procedures to test the various sectors of the transmit and receive antennas. In a wide sector sweep procedure, the transmitter and receiver test wide sectors to find the best wide transmit and receive sectors for transferring data. Then in a narrow sector sweep procedure, narrow sectors within and/or adjacent to the best wide sectors are tested, to find the best narrow sectors. This reduces the amount of sectors that are tested during the enhanced beamforming training procedure by skipping those narrow sectors that are far away from the best wide sectors.

20 Claims, 11 Drawing Sheets

(56) References Cited

U.S. PATENT DOCUMENTS

| | | |
|---|---|---|
| 8,300,563 B2 | 10/2012 | Krishnaswamy et al. |
| 8,365,238 B2 | 1/2013 | Reznic et al. |
| 8,422,961 B2 | 4/2013 | Kafle |
| 8,457,026 B1 | 6/2013 | Ho et al. |
| 9,450,620 B1 | 9/2016 | Ahmed et al. |
| 9,716,537 B2 | 7/2017 | Mammoser et al. |
| 9,786,985 B2 | 10/2017 | Kim et al. |
| 9,799,954 B2 | 10/2017 | Preradovic et al. |
| 9,948,413 B1 | 4/2018 | Zhou et al. |
| 10,312,980 B2 | 6/2019 | Maamari et al. |
| 2003/0072376 A1 | 4/2003 | Krishnamachari et al. |
| 2004/0081238 A1 | 4/2004 | Parhy |
| 2004/0196919 A1 | 10/2004 | Mehta et al. |
| 2004/0204103 A1 | 10/2004 | Rouphael |
| 2005/0185097 A1 | 8/2005 | Takatori et al. |
| 2006/0017843 A1 | 1/2006 | Shi et al. |
| 2006/0209890 A1 | 9/2006 | MacMullan et al. |
| 2006/0209892 A1 | 9/2006 | MacMullan et al. |
| 2006/0212911 A1 | 9/2006 | MacMullan et al. |
| 2007/0223380 A1 | 9/2007 | Gilbert et al. |
| 2008/0064425 A1 | 3/2008 | Kim et al. |
| 2008/0088635 A1 | 4/2008 | Callway et al. |
| 2008/0144713 A1 | 6/2008 | Kimmich et al. |
| 2009/0150943 A1 | 6/2009 | Vasudevan et al. |
| 2009/0213940 A1 | 8/2009 | Steinbach et al. |
| 2010/0009635 A1 | 1/2010 | Qin et al. |
| 2010/0214169 A1 | 8/2010 | Kafle |
| 2011/0058104 A1 | 3/2011 | Arai |
| 2011/0070928 A1 | 3/2011 | Hsu et al. |
| 2011/0151790 A1 | 6/2011 | Khandekar et al. |
| 2011/0286545 A1 | 11/2011 | Guignard et al. |
| 2012/0276896 A1 | 11/2012 | Ren et al. |
| 2012/0327115 A1 | 12/2012 | Chhetri et al. |
| 2013/0115887 A1 | 5/2013 | Kwon et al. |
| 2013/0242117 A1 | 9/2013 | Luo et al. |
| 2014/0010319 A1 | 1/2014 | Baik et al. |
| 2014/0126620 A1 | 5/2014 | Maltsev et al. |
| 2014/0266900 A1 | 9/2014 | Kasher |
| 2014/0269937 A1 | 9/2014 | Wadsworth et al. |
| 2014/0368667 A1 | 12/2014 | Peterson et al. |
| 2015/0110167 A1 | 4/2015 | Chen et al. |
| 2015/0189686 A1* | 7/2015 | Kasher .................. H04W 76/18 455/41.2 |
| 2015/0289147 A1 | 10/2015 | Lou et al. |
| 2015/0333994 A1 | 11/2015 | Gell et al. |
| 2015/0341646 A1 | 11/2015 | Sze et al. |
| 2016/0105229 A1 | 4/2016 | Trainin et al. |
| 2016/0134485 A1 | 5/2016 | Thapliya et al. |
| 2016/0149633 A1 | 5/2016 | Sanderovich et al. |
| 2016/0227432 A1 | 8/2016 | Freeman et al. |
| 2016/0301770 A1 | 10/2016 | Marra et al. |
| 2016/0337150 A1 | 11/2016 | Larsson et al. |
| 2017/0026263 A1 | 1/2017 | Gell et al. |
| 2017/0127408 A1 | 5/2017 | Du |
| 2017/0134076 A1 | 5/2017 | Maamari et al. |
| 2017/0141885 A1 | 5/2017 | Bontu et al. |
| 2017/0156067 A1 | 6/2017 | Huang |
| 2017/0207839 A1 | 7/2017 | Eitan et al. |
| 2017/0222704 A1 | 8/2017 | Eitan et al. |
| 2017/0251484 A1 | 8/2017 | Negus et al. |
| 2017/0264350 A1 | 9/2017 | Sanderovich et al. |
| 2018/0062719 A1 | 3/2018 | Verma et al. |
| 2018/0074188 A1 | 3/2018 | Polo et al. |
| 2018/0088225 A1* | 3/2018 | Karls ..................... H04W 4/02 |
| 2018/0093177 A1 | 4/2018 | Tokubo |
| 2018/0123901 A1 | 5/2018 | Yermakov et al. |
| 2018/0137412 A1 | 5/2018 | Nikkhah et al. |
| 2018/0198506 A1 | 7/2018 | Sanderovich et al. |
| 2018/0199256 A1 | 7/2018 | Sanderovich et al. |
| 2018/0205423 A1 | 7/2018 | Sanderovich et al. |
| 2018/0227027 A1 | 8/2018 | Trainin et al. |
| 2018/0234860 A1 | 8/2018 | Kasher et al. |
| 2018/0248603 A1 | 8/2018 | Kasher et al. |
| 2018/0288635 A1 | 10/2018 | Kaushik et al. |
| 2019/0036572 A1 | 1/2019 | Kasher et al. |
| 2019/0068473 A1 | 2/2019 | Vu |
| 2019/0068926 A1 | 2/2019 | Vu et al. |
| 2019/0101638 A1 | 4/2019 | Vu et al. |
| 2019/0104276 A1 | 4/2019 | Vu et al. |
| 2019/0104458 A1 | 4/2019 | Svennebring et al. |
| 2019/0158156 A1 | 5/2019 | Da Silva et al. |
| 2019/0173544 A1 | 6/2019 | Vu et al. |
| 2019/0199467 A1 | 6/2019 | Vu |
| 2019/0215043 A1* | 7/2019 | Trainin ................ H04B 7/0617 |
| 2019/0215256 A1 | 7/2019 | Dhanabalan et al. |
| 2019/0230185 A1 | 7/2019 | Dhanabalan et al. |
| 2019/0261209 A1 | 8/2019 | Balasubramanian et al. |

OTHER PUBLICATIONS

Non-Final Office Action in U.S. Appl. No. 15/686,927, dated Aug. 8, 2018, 19 pages.

Final Office Action in U.S. Appl. No. 15/686,927, dated Jan. 17, 2019, 17 pages.

Non-Final Office Action in U.S. Appl. No. 15/686,934, dated Jan. 25, 2019, 8 pages.

International Search Report and Written Opinion in International Application No. PCT/US2018/052350, dated Dec. 14, 2018, 13 pages.

Van Der Schaar et al., "Robust Transmission of MPEG-4 Scalable Video Over 4G Wireless Networks", International Conference on Image Processing, Sep. 22, 2002, pp. 757-760, vol. 3, IEEE.

International Search Report and Written Opinion in International Application No. PCT/US2018/052373, dated Jan. 7, 2019, 13 pages.

Non-Final Office Action in U.S. Appl. No. 15/686,927, dated Jun. 11, 2019, 12 pages.

Non-Final Office Action in U.S. Appl. No. 15/721,125, dated Feb. 20, 2019, 9 pages.

Non-Final Office Action in U.S. Appl. No. 15/852,833, dated May 31, 2019, 11 pages.

Final Office Action in U.S. Appl. No. 15/721,125, dated Sep. 10, 2019, 9 pages.

Final Office Action in U.S. Appl. No. 15/686,927, dated Oct. 2, 2019, 7 pages.

Final Office Action in U.S. Appl. No. 15/852,833, dated Oct. 3, 2019, 12 pages.

Final Office Action in U.S. Appl. No. 15/686,934, dated Oct. 16, 2019, 9 pages.

* cited by examiner

VIRTUAL REALITY BEAMFORMING

BACKGROUND

Description of the Related Art

A wireless communication link can be used to send a video stream from a computer (or other device) to a virtual reality (VR) headset (or head mounted display (HMD). Transmitting the VR video stream wirelessly eliminates the need for a cable connection between the computer and the user wearing the HMD, thus allowing for greater freedom of movement by the user. A traditional cable connection between a computer and HMD typically includes one or more data cables and one or more power cables. Allowing the user to move around free of a cable tether and without having to be cognizant of avoiding the cable creates a more immersive VR system. Sending the VR video stream wirelessly also allows the VR system to be utilized in a wider range of applications than previously possible.

Wireless VR video streaming applications typically have high resolution and high frame-rates, which equates to high data-rates. However, the link quality of the wireless link over which the VR video is streamed has capacity characteristics that can vary from system to system and fluctuate due to changes in the environment (e.g., obstructions, other transmitters, radio frequency (RF) noise). To adapt to changing link quality of the wireless link, periodic beamforming procedures are typically performed between two communicating stations to update the transmit and receive sectors that are utilized for sending data. However, the time required to perform beamforming is a dead stall in the wireless transport during which time data transmissions are halted and queued waiting for beamforming to complete.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
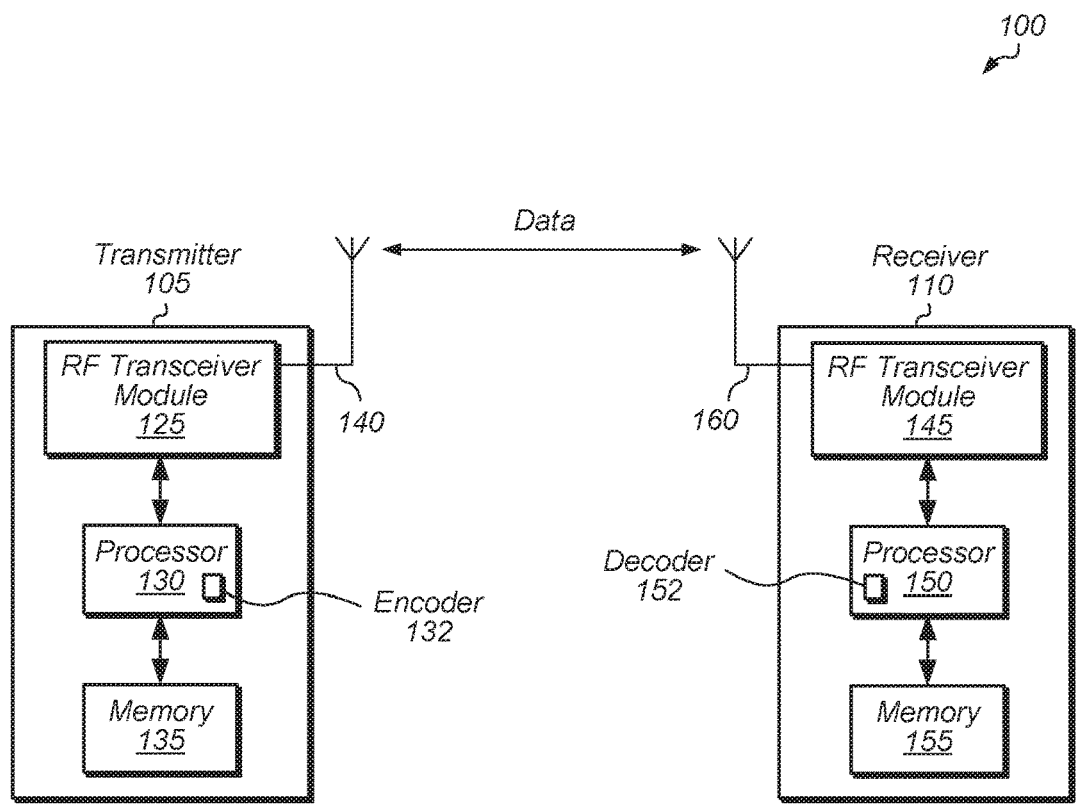
FIG. 1 is a block diagram of one implementation of a system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing enhanced beamforming training procedures are disclosed herein. In one implementation, a system includes a transmitter communicating over a wireless link with a receiver. To maintain a high quality of transmission over the wireless link, the transmitter and receiver perform periodic beamforming training procedures to test the various sectors of the transmit and receive antennas. During such beamforming procedures, beamforming (or "training") data is transmitted via a number of sectors in order to identify sectors that are desirable for transmitting application data (e.g., video data intended to be viewed, audio data, web browser data, etc.). In various embodiments, the beamforming data is not itself application data. However, in other embodiments, the beamforming data is application data. In a wide phase of a beamforming procedure, the transmitter and receiver test wide sectors to find the best wide sectors for transferring data. Then in a narrow phase of the beamforming procedure, narrow sectors within and/or adjacent to the best wide sector are tested to find the best narrow sector. This approach reduces the number of sectors that are tested during the enhanced beamforming procedure by skipping testing of those narrow sectors that are far away from the best wide sector. By reducing the number of sectors that are tested, the enhanced beamforming procedure can be completed more quickly, reducing the amount of "dead" time during which transmission of application data over the wireless link is halted.

In one implementation, the receiver (e.g., HMD) has multiple radio-frequency (RF) antennas to choose from. In one implementation, the receiver has three RF antennas while in other implementation, the receiver has other numbers of RF antennas. In one implementation, the best RF antenna for the receiver to use for the beamforming procedure and for the subsequent data transmission phase is found during the wide phase of the beamforming procedure. To find the receiver's best RF antenna, the transmitter will execute the wide phase of the beamforming procedure N times separated by an interframe spacing interval, where N is equal to the number of RF antennas on the receiver. The receiver will turn on a different RF omnidirectional antenna for each of these wide sector sweeps. At the conclusion of the N sweeps, the receiver will know which RF antenna to use for the remainder of the beamforming procedure and subsequent data transfer phase.

Referring now to FIG. 1, a block diagram of one implementation of a system 100 is shown. System 100 includes at least a first communications device (e.g., transmitter 105) and a second communications device (e.g., receiver 110) operable to communicate with each other wirelessly. It is noted that transmitter 105 and receiver 110 can also be referred to as transceivers. In one implementation, transmitter 105 and receiver 110 communicate wirelessly over the unlicensed 60 Gigahertz (GHz) frequency band. For example, in this implementation, transmitter 105 and receiver 110 communicate in accordance with the Institute of Electrical and Electronics Engineers (IEEE) 802.11ad standard (i.e., WiGig). In other implementations, transmitter 105 and receiver 110 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the IEEE 802.11 standards (i.e., WiFi), mobile telecommunications standards (e.g., CDMA, LTE, GSM, WiMAX), etc.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various implementations, transmitter 105 and receiver 110 perform periodic beamforming training procedures to determine the optimal transmit and receive antenna combinations for wireless data transmission.

In one implementation, transmitter 105 and receiver 110 have directional transmission and reception capabilities, and the exchange of communications over the link utilizes directional transmission and reception. Each directional transmission is a transmission that is beamformed so as to be directed towards a selected transmit sector of antenna 140. Similarly, directional reception is performed using antenna settings optimized for receiving incoming transmissions from a selected receive sector of antenna 160. The link quality can vary depending on the transmit sectors selected for transmissions and the receive sectors selected for receptions. The transmit sectors and receive sectors which are selected are determined by system 100 performing a beamforming training procedure. In one implementation, an enhanced beamforming procedure is performed which consists of two phases. In a first phase of the beamforming procedure, only wide sectors are tested so as to find the best wide sectors for communicating between transmitter 105 and receiver 110. Then, in a second phase of the beamforming procedure, only those narrow sectors within and/or adjacent to the best wide sectors are tested. Once the best narrow sectors are identified during the second phase, these best narrow sectors will be used for the subsequent data transfer phase.

Transmitter 105 and receiver 110 are representative of any type of communication devices and/or computing devices. For example, in various implementations, transmitter 105 and/or receiver 110 are any of a mobile phone, tablet, computer, server, head-mounted display (HMD), television, another type of display, router, or other types of computing or communication devices. In one implementation, system 100 executes a virtual reality (VR) application for wirelessly transmitting frames of a rendered virtual environment from transmitter 105 to receiver 110. In other implementations, other types of applications are implemented by system 100 that take advantage of the methods and mechanisms described herein.

In one implementation, transmitter 105 includes a processor 130, memory 135, antenna 140, and transceiver module 125 (e.g., a device, unit, or circuitry configured to transmit and receive data). In one embodiment, transceiver module 125 is a radio frequency (RF) transceiver. For ease of discussion, the following describes embodiments using a transceiver. However, it is to be understood that the methods and mechanisms described herein may be used in embodiments using separate transmitter and receiver devices. Both approaches are contemplated in the following descriptions. As such, references to a transmitter refer to either elements of a transceiver or a distinct transmitter, references to a receiver refer to either elements of a transceiver or a distinct receiver, and references to a transmitter and receiver may refer to a single transceiver or separate devices. Further, communications outside of the RF range (e.g., ~3 kHz-300 GHz) are also contemplated. RF transceiver module 125 transmits and receives RF signals. In one implementation, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 also converts RF signals into baseband signals for the extraction of data by transmitter 105. It is noted that RF transceiver module 125 is shown as a single unit for illustrative purposes. It should be understood that RF transceiver module 125 is implemented with any number of different units (e.g., chips) depending on the implementation. Similarly, processor 130 and memory 135 are representative of any number and type of processors and memory devices, respectively, that are implemented as part of transmitter 105. In one implementation, processor 130 includes encoder 132 to encode (i.e., compress) a video stream prior to transmitting the video stream to receiver 110 via RF transceiver module 125. In other implementations, encoder 132 is implemented separately from processor 130. In various implementations, encoder 132 is implemented using any suitable combination of hardware and/or software.

Transmitter 105 also includes antenna 140 for transmitting and receiving RF signals. Antenna 140 represents one or more antennas, such as a phased array, a single element antenna, a set of switched beam antennas, etc., that are configured to change the directionality of the transmission and reception of radio signals. As an example, antenna 140 includes one or more antenna arrays, where the amplitude or phase for each antenna within an antenna array is configured independently of other antennas within the array. Although antenna 140 is shown as being external to transmitter 105, it should be understood that antenna 140 can be included internally within transmitter 105 in various implementations. Additionally, it should be understood that transmitter 105 can also include any number of other components which are not shown to avoid obscuring the figure. Similar to transmitter 105, the components implemented within receiver 110 include at least RF transceiver module 145, processor 150, decoder 152, memory 155, and antenna 160, which are analogous to the components described above for transmitter 105. It should be understood that receiver 110 can also include or be coupled to other components (e.g., a display).

Figure 2:
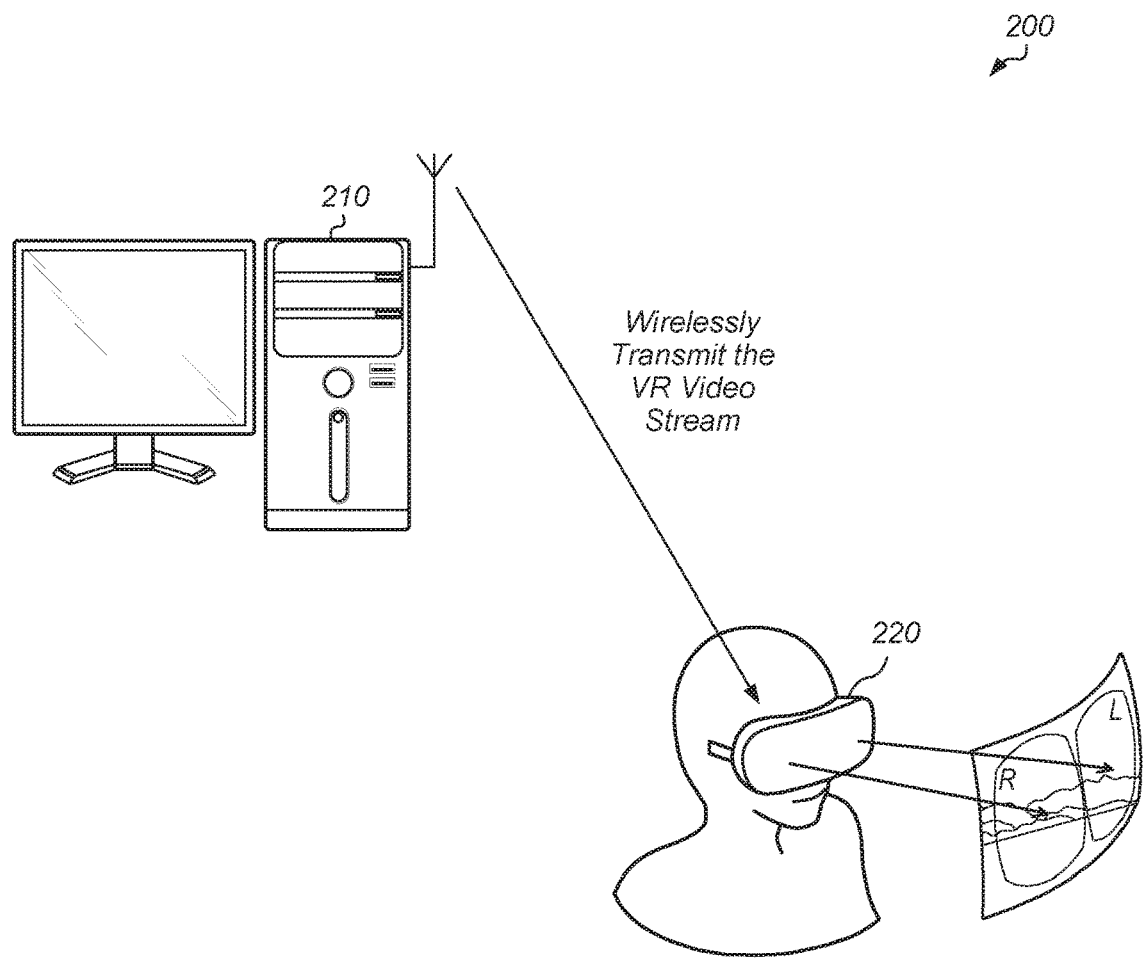
FIG. 2 is a block diagram of one implementation of a wireless virtual reality (VR) system.

Turning now to FIG. 2, a block diagram of one implementation of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other implementations, other computing devices, besides a personal computer, are utilized to send video data wirelessly to head-mounted display (HMD) 220. For example, computer 210 can be a gaming console, smart phone, set top box, television set, video streaming device, wearable device, a component of a theme park amusement ride, or otherwise. Also, in other implementations, HMD 220 can be a computer, desktop, television or other device used as a receiver connected to a HMD or other type of display.

Computer 210 and HMD 220 each include circuitry and/or components to communicate wirelessly. It is noted that while computer 210 is shown as having an external antenna, this is shown merely to illustrate that the video data is being sent wirelessly. It should be understood that computer 210 can have an antenna which is internal to the physical case of computer 210. Additionally, while computer 210 can be powered using a wired power connection, HMD 220 is typically battery powered. Alternatively, computer 210 can be a laptop computer (or another type of device) powered by a battery.

In one implementation, computer 210 includes circuitry which dynamically renders a representation of a VR environment to be presented to a user wearing HMD 220. For example, in one implementation, computer 210 includes one or more graphics processing units (GPUs) executing program instructions so as to render a VR environment. In other implementations, computer 210 includes other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220. In addition to rendered VR frames, other traffic can be sent between computer 210 and HMD 220. For example, in one implementation, universal serial bus (USB) and control traffic is sent back and forth from computer 210 and HMD 220 in between beamforming procedures.

Figure 3:
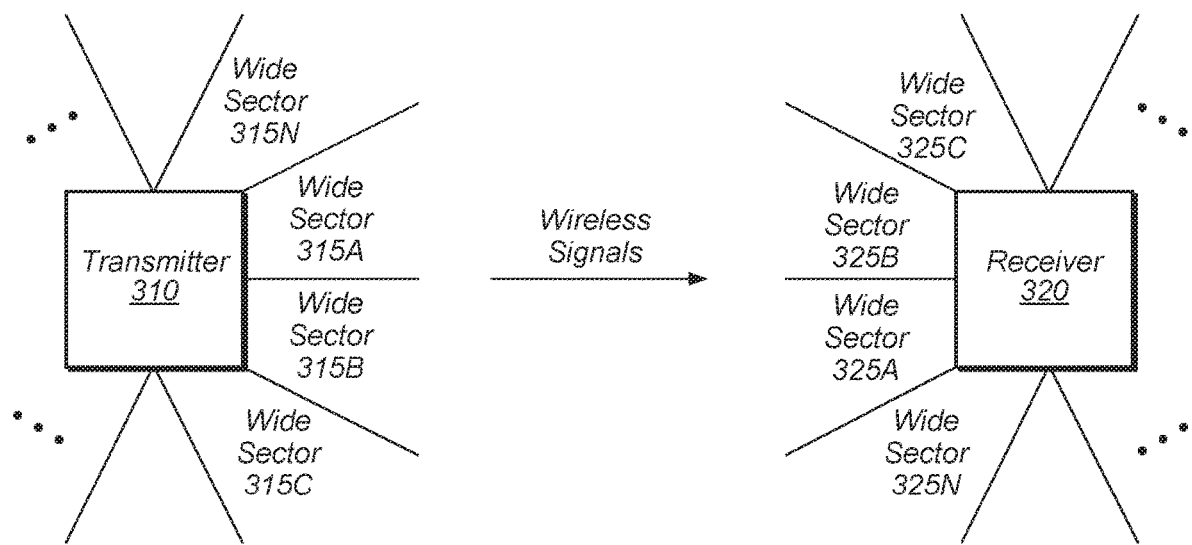
FIG. 3 is a diagram depicting transmit and receive beamforming wide sectors in accordance with one implementation.

Referring now to FIG. 3, a diagram depicting transmit and receive beamforming wide sectors is shown. In one implementation, transmitter 310 is able to perform each of its directional transmissions towards a respective transmit wide sector selected from among a plurality of transmit wide sectors 315A-N. Transmit wide sectors 315A-N are representative of any number of transmit wide sectors, with the number varying from implementation to implementation. Receiver 320 is also able to perform each of its directional receptions from a respective receive wide sector selected from among a plurality of receive wide sectors 325A-N, which are representative of any number of receive wide sectors. The wide sectors 315A-N and 325A-N shown in FIG. 3 can also be referred to herein as sectors of a first sector granularity level. As used herein, a sector granularity level generally refers to a size (e.g., a width or angle) of a sector. For example, in FIG. 3, sector 315A may generally form an angle of 30 degrees. A larger or more coarse granularity would have an angle greater than 30 degrees, while a smaller or finer granularity would have an angle less than 30 degrees.

During a wide phase of a beamforming procedure, transmitter 310 directionally transmits beamforming data (e.g., frames or otherwise) by sweeping through each of the transmit wide sectors 315A-N. Each frame includes an identifier (ID) of the transmit wide sector 315A-N through which the frame was transmitted. If transmitter 310 transmits signals toward transmit wide sectors in a direction away from receiver 320, the energy levels of signals received by receiver 320 will be low, preventing receiver 320 from successfully receiving the signals. These signals will not be received by receiver 320 or the signals will be received with a relatively low signal strength. Otherwise, if transmitter 310 transmits signals to a transmit wide sector oriented toward receiver 320, signals will arrive at receiver 320 with high levels of energy. For example, if receiver 320 is monitoring receive wide sector 325A or 325B for incoming transmissions at the same time that a signal arrives from transmitter 310 with high levels of energy, receiver 320 will receive the signal with a high level of power, enabling receiver 320 to successfully extract the data from the signal. During the wide phase of the beamforming procedure, transmitter 310 and receiver 320 each cycle through the different wide sectors to determine the best configuration for transmitting data from transmitter 310 to receiver 320. Following completion of the wide phase of the beamforming procedure, a narrow(er) phase of the beamforming procedure is initiated. The implementation of the narrow phase of the beamforming procedure is described in further detail in the discussion associated with FIG. 4.

If one or both of transmitter 310 and receiver 320 are mobile, then the best sectors for transmitting data can change over time. Accordingly, transmitter 310 and receiver 320 can repeat the beamforming procedure, consisting of a wide phase followed by a narrow phase, at periodic intervals to determine if an alternate configuration would result in a better connection. Transmitter 310 and receiver 320 repeat the beamforming procedure periodically in order to determine whether link quality can be improved by using different beamforming parameters. In one implementation, transmitter 310 and receiver 320 determine whether to initiate a beamforming training procedure based on a signal-to-noise ratio (SNR) measurement of a received signal over beamformed links, based on a packet reception rate, based on a fixed schedule, based on a programmable schedule, and/or based on other factors.

Figure 4:
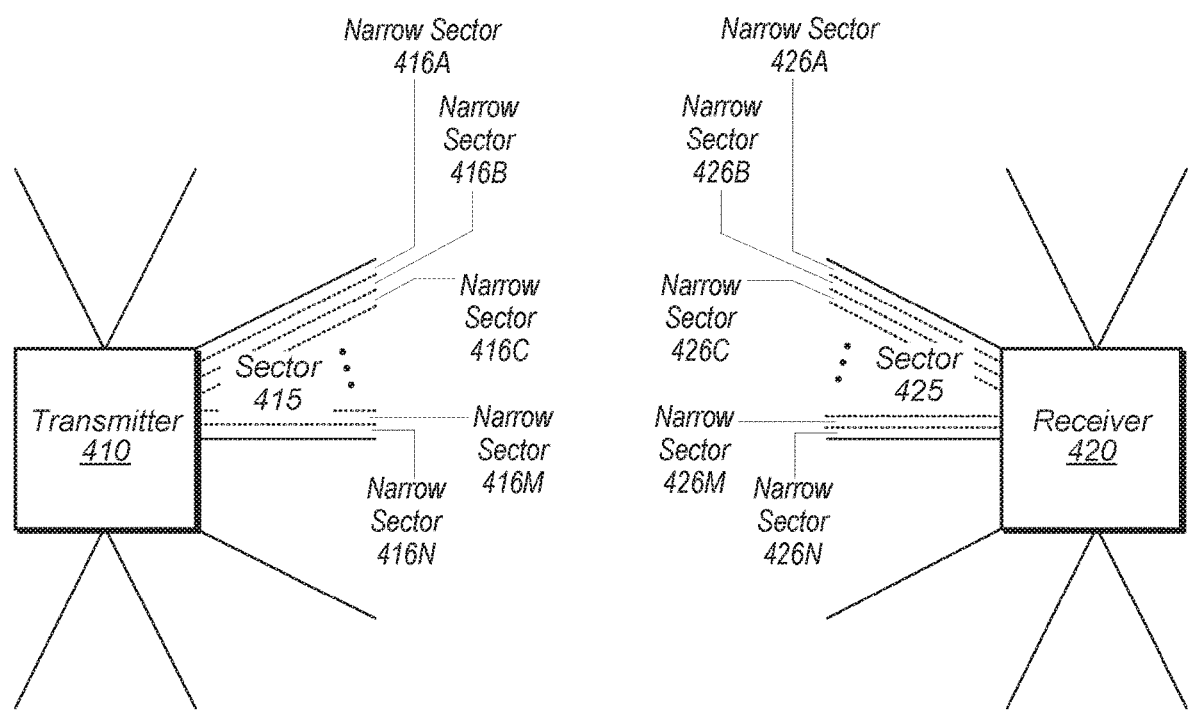
FIG. 4 is a diagram depicting transmit and receive beamforming narrow sectors in accordance with one implementation.

Turning now to FIG. 4, a diagram depicting transmit and receive beamforming narrow sectors are shown. The illustration of FIG. 4 is intended to be a continuation of the discussion from FIG. 3. After a wide phase of a beamforming procedure is performed for transmitter 310 and receiver 320 (of FIG. 3), the preferred (i.e., best) wide sectors are determined. In one implementation, the preferred wide sectors are the wide sectors which resulted in the highest (or relatively high compared to other sectors) received signal strength values during the wide phase of the beamforming procedure.

For the purposes of this discussion, it is assumed that sector 415 is the preferred wide transmit sector for transmitter 410 and sector 425 is the preferred wide receive sector for receiver 420. Accordingly, after the preferred wide transmit and receive sectors are determined, a narrow phase of the beamforming procedure is performed to determine the preferred (i.e., best or relatively better) narrow sectors within these preferred wide sectors. For example, an initiator sector sweep procedure is performed by transmitter 410 sending frames on narrow sectors 416A-N within the preferred wide sector 415. As one example, if wide sector formed an angle of 30 degrees, ten narrow sectors each forming an angle of 10 degrees may be used for the second phase. Also during the initiator sector sweep procedure, receiver 420 receives frames on narrow sectors 426A-N of preferred wide sector 425. The signal strengths of captured signals are recorded and used to determine which of the narrow sectors 416A-N is the preferred narrow sector for transmitter 410. Also, the captured signal strengths are used to determine which of the narrow sectors 416A-N is the preferred narrow sector for receiver 420. While only narrow sectors 416A-N which are located within sector 415 and only narrow sectors 426A-N which are located within preferred wide sector 425 are tested in one implementation, it should be understood that in other implementations, narrow sectors which are adjacent to the preferred wide sectors 415 and 425 can also be tested.

Figure 5:
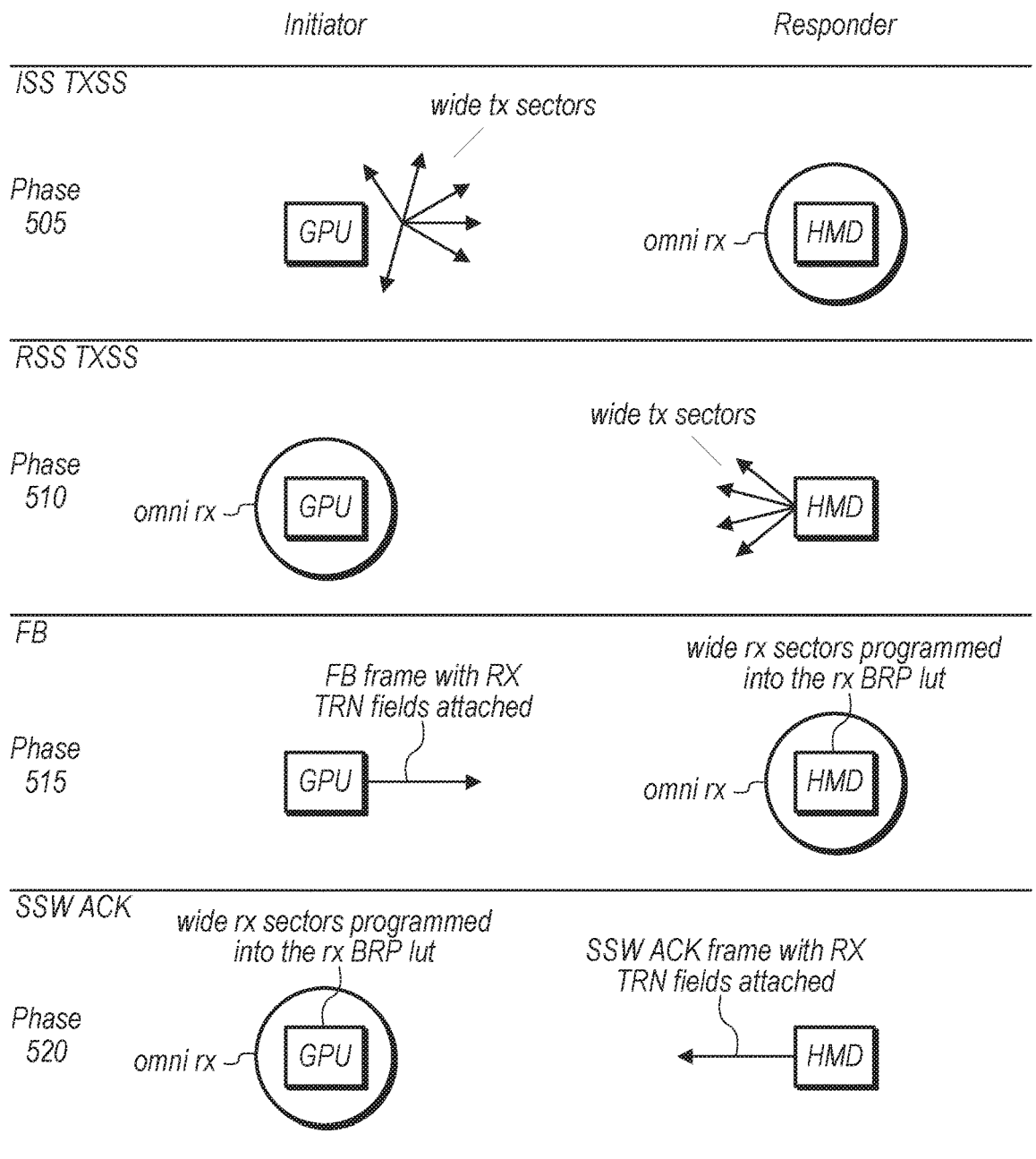
FIG. 5 is a diagram of one implementation of a wide phase of a beamforming procedure.

Referring now to FIG. 5, a diagram of one implementation of a wide phase 500 of a beamforming procedure is shown. In a first phase 505 of wide phase 500, the initiator (e.g., GPU) transmits frames on each of the wide transmit sectors. It is noted that the initiator can also be referred to herein as a transmitter. The responder (e.g., HMD) enables an omnidirectional antenna for receiving the frames sent by the transmitter. The responder measures the received signal strength of each of the received frames. It is noted that the responder can also be referred to herein as a receiver. It should be understood that while the initiator is shown as a GPU in FIG. 5, in other implementations, other types of initiators are utilized. Additionally, while a HMD is shown as the responder in FIG. 5, in other implementations, the responder can be other types of devices.

As used herein, the term "wide sector" is defined as a sector covering a relatively large percentage of the total omnidirectional space. In contrast, the term "narrow sector" is defined as a sector covering a relatively small percentage of the total omnidirectional space. For example, in one implementation, there are 8 wide transmit sectors for the entire omnidirectional space while there are 64 narrow transmit sector for the entire omnidirectional space. Or said another way, for each wide transmit sector, there are multiple narrow transmit sectors that fit within the wide transmit sector.

In phase 510, the responder transmits beamforming training sequence frames using wide transmit sectors while the initiator uses an omnidirectional antenna to receive the frames. Also in phase 510, the responder sends an ID of the transmit sector which was extracted from the frame that had the highest received signal strength from phase 505. The initiator receives the ID of the transmit sector and designates this transmit sector as the preferred wide sector. Also during phase 510, the initiator records the received signal strength for each of the received frames. In phase 515, a feedback frame is sent from the initiator to the responder with receive training fields and an ID of the responder's transmit sector which was extracted from the frame that had the highest received signal strength from phase 510. In one implementation, a single feedback frame is sent in phase 515 from the initiator to the responder on the initiator's preferred wide sector. In anticipation of receiving the feedback frame, the responder programs receive beam refinement protocol (BRP) data (e.g., a lookup table (LUT) or other data structure) with wide receive sectors that it wants to train. When the responder receives the feedback frame in phase 515, the responder uses the training field data in the feedback frame to train the wide receive sectors programmed in the BRP LUT. The receive training fields are used to find the best wide receive sector of the responder.

During phase 520, the responder sends an acknowledgement (ACK) frame with receive training fields. In anticipation of receiving the ACK frame, the initiator programs a receive BRP lookup table with wide receive sectors that it wants to train. When the initiator receives the ACK frame in phase 520, the initiator uses the receive training fields retrieved from the ACK frame to train the wide receive sectors programmed in the BRP LUT. It is noted that in one implementation of phases 505-520 of procedure 500, the sectors are designed to allow the successful execution of the entire procedure 500 at modulation coding scheme (MCS) level 1 rates instead of using MCS level 0 rates. MCS level 0 uses binary phase shift keying (BPSK) modulation to encode a single bit per symbol at a relatively low data rate. MCS level 1 uses BPSK modulation but with a data rate that is twice the data rate of MCS level 0. Other MCS levels utilize other types of modulation with data rates that increase as the MCS level increases. Generally speaking, a higher MCS level carries more data but offers less protection against noise or distortion on the link. At the end of wide sector sweep procedure 500, both the initiator and the responder know the best wide transmit sector and the best wide receive sector to communicate with the other side.

Figure 6:
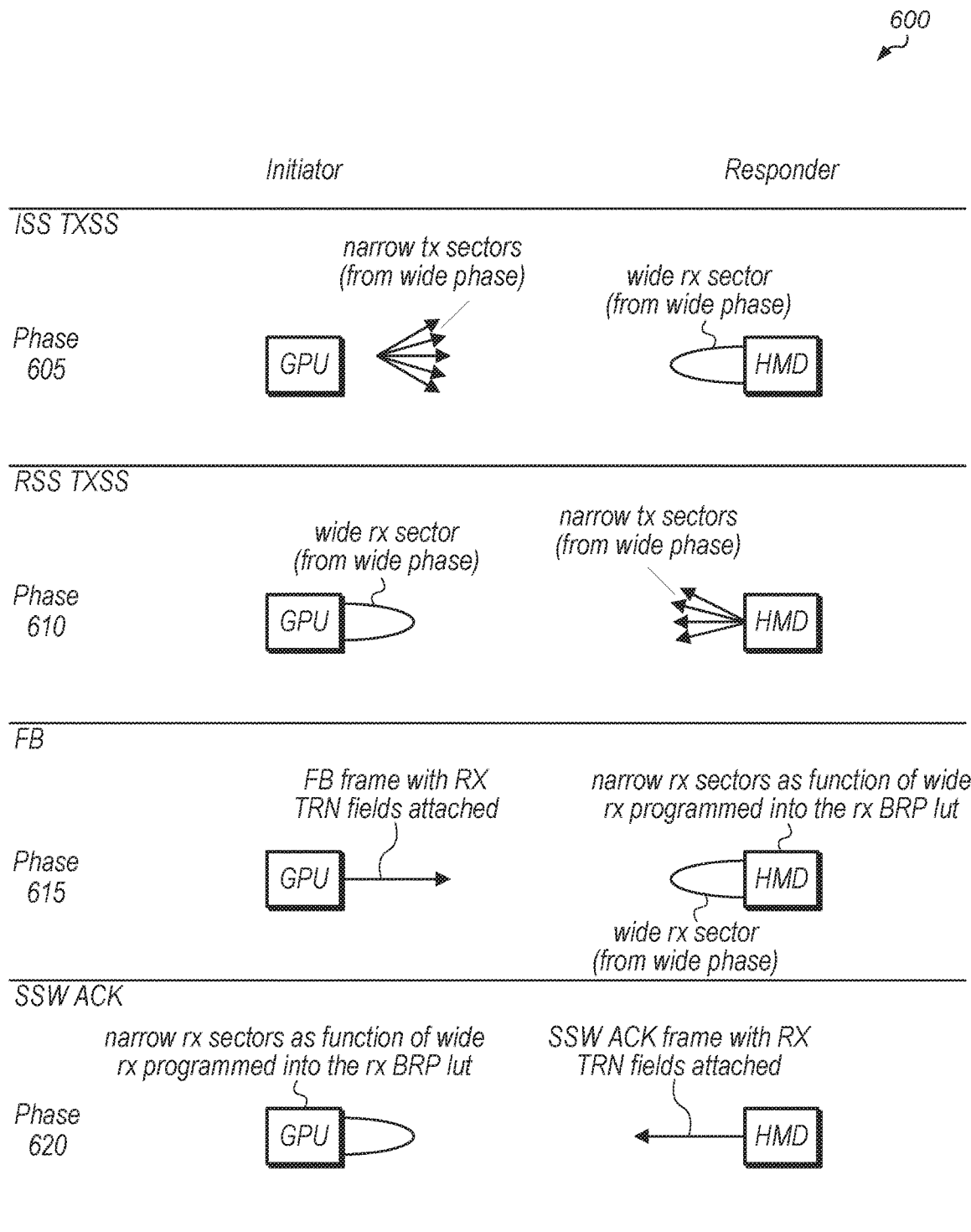
FIG. 6 is a diagram of one implementation of a narrow phase of a beamforming procedure.

Turning now to FIG. 6, a diagram of one implementation of a narrow phase 600 of a beamforming procedure is shown. For the purposes of this discussion, it is assumed that narrow phase 600 is performed subsequent to a wide phase (e.g., wide phase 500 of FIG. 5). In phase 605 of narrow phase 600, the initiator (e.g., GPU) transmits beamforming training sequence frames on the narrow transmit sectors within and/or neighboring the best wide transmit sector that was discovered during the wide phase. In phase 605, the responder (e.g., HMD) sets its receive antenna to receive on the best wide receive sector which was determined during the wide phase. Then, the responder captures and records the signal strengths of the received frames and correlates the captured signal strengths with the corresponding narrow transmit sectors of the initiator using the sector numbers extracted from the received frames.

Next, during phase 610, the responder transmit frames on the narrow transmit sectors which are within and/or neighboring the best wide transmit sector determined during the wide phase. The frames transmitted by the responder during phase 610 include an ID of the narrow transmit sector of the initiator which resulted in the highest captured signal strength value from phase 605. Then, during phase 615, the initiator sends a feedback frame with receive training fields and an ID of the narrow transmit sector of the responder which resulted in the highest captured signal strength value from phase 610. The responder receives the feedback frame sent in phase 615 with its antenna set to the wide receive sector which was determined during the wide phase. In anticipation of receiving the feedback frame, the responder programs a receive BRP LUT with narrow receive sectors that it wants to train. When the responder receives the feedback frame in phase 615, the responder uses the training field data in the feedback frame to train the narrow receive sectors programmed in the BRP LUT. During phase 620, the responder sends an acknowledgment (ACK) frame with receive training fields. In anticipation of receiving the ACK frame, the initiator programs a receive BRP lookup table with narrow receive sectors that it wants to train. The initiator extracts the receive training fields for the narrow sectors and uses the receive training fields to train the narrow receive sectors programmed in the receive BRP lookup table. The receive training fields are used to find the best narrow receive sector of the initiator.

Figure 7:
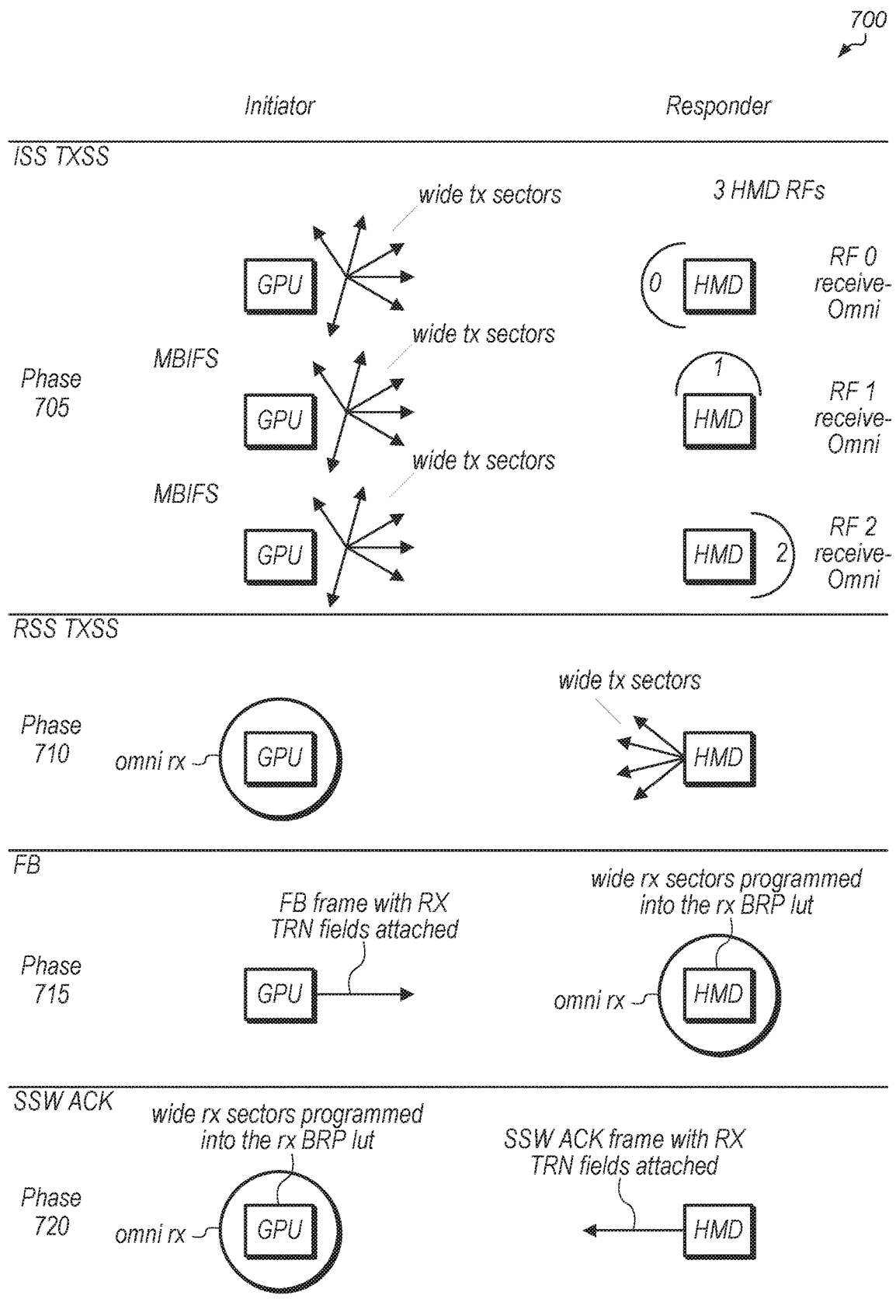
FIG. 7 is a diagram of one implementation of a multi-RF beamforming procedure.

Referring now to FIG. 7, a diagram of one implementation of a multi-radio frequency (RF) beamforming training procedure 700 is shown. In one implementation, a responder (e.g., HMD) has three separate RF omnidirectional receive antennas. In other implementations, the responder can have other numbers of separate RF omnidirectional receive antennas. In phase 705 of the multi-RF beamforming training procedure 700, the initiator (e.g., GPU) transmits beamforming training sequence frames followed by an interframe spacing interval (e.g., medium beamforming interframe spacing (MBIFS) interval) using the three different RF channels sweeping across the wide transmit sectors. The responder uses a first omnidirectional receive antenna to receive the first set of frames sent on the wide transmit sectors. Then, the responder uses a second omnidirectional receive antenna to receive the second set of frames and a third omnidirectional receive antenna to receive the third set of frames. The responder records the received signal strength values for the various received frames and identifies the best antenna and best wide transmit sector based on which received frame had the highest received signal strength.

Next, during phase 710, the responder transmits beamforming training sequence frames on the wide transmit sectors and the initiator receives the beamforming training sequences using an omnidirectional receive antenna. Also during phase 710, the responder sends an ID of the best wide transmit sector that was identified during phase 705. The initiator receives the ID of the best wide transmit sector and measures and stores the received signal strength measurements of the received frames. Then, during phase 715, the initiator uses the best wide transmit sector to send a feedback frame with receive training fields and an ID of the responder's best wide transmit sector from phase 710. In anticipation of receiving the feedback frame, the responder programs a receive BRP LUT with wide receive sectors that it wants to train. In phase 715, the responder uses the omnidirectional antenna that had the best received signal strength values from phase 705 to receive the feedback frame, and then the responder determines a best wide receive sector to use based on the receive training fields.

Next, in phase 720, the responder uses the best wide transmit sector to send an ACK frame with receive training fields to the initiator. In anticipation of receiving the ACK frame, the initiator programs a receive BRP LUT with wide receive sectors that it wants to train. The initiator uses an omnidirectional antenna to receive the ACK frame. The initiator extracts the receive training fields from the ACK frame and then determines a best wide receive sector to use based on the receive training fields. It should be understood that the arrangement of phases 705-720 of multi-RF beamforming training procedure 700 are indicative of one particular implementation. In other implementations, multi-RF beamforming training procedure 700 can include other arrangements of phases that include other actions by the initiator and/or the responder. In one implementation, procedure 700 is followed by a narrow sector sweep procedure to find the best narrow transmit and receive sectors within and/or adjacent to the best wide sectors.

Figure 8:
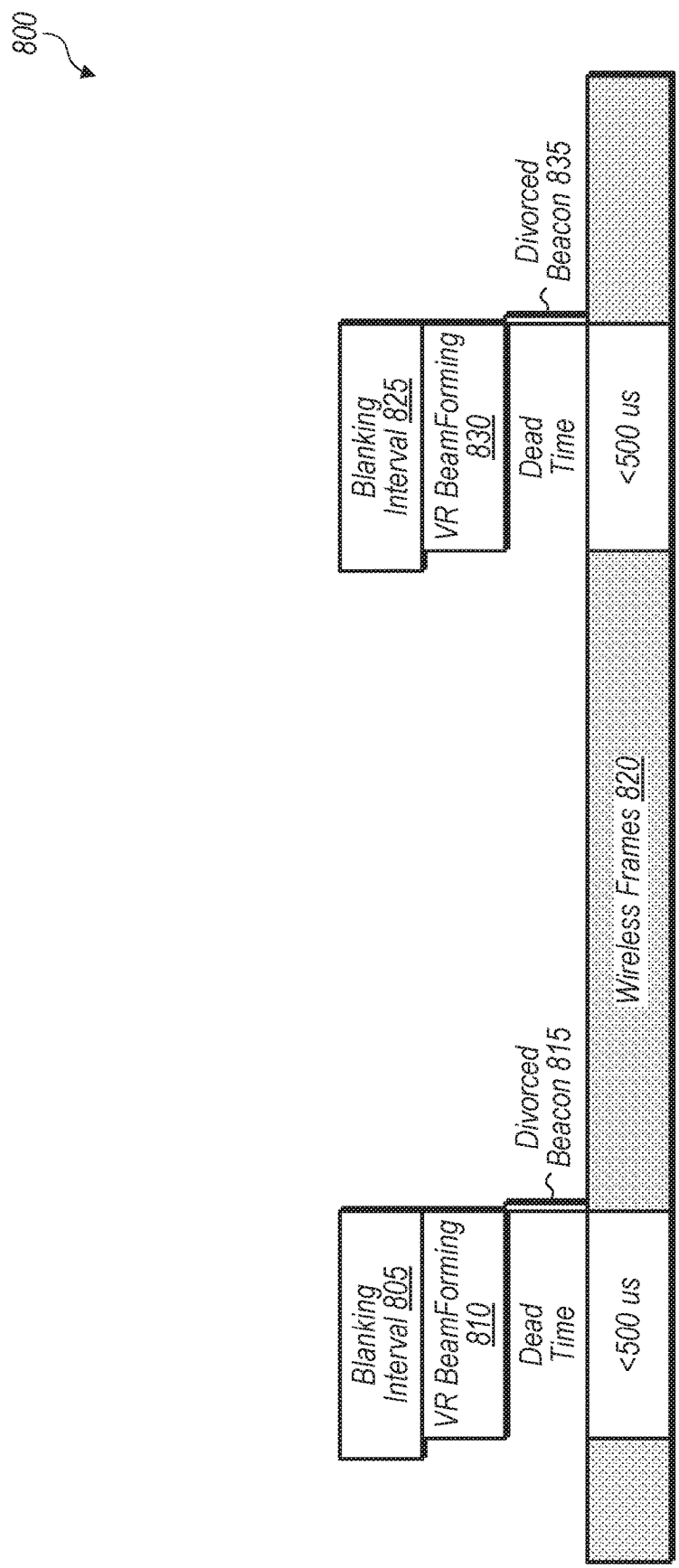
FIG. 8 is a timing diagram of video vertical blanking intervals and beamforming procedure intervals.

Turning now to FIG. 8, a timing diagram 800 of video vertical blanking intervals and beamforming procedure intervals is shown. In one implementation, the VR beamforming procedure 810 is performed during blanking interval 805. The time when the VR beamforming procedure 810 is performed is considered dead time since wireless frames are not able to be sent during this time. In one implementation, VR beamforming procedure 810 takes less than 500 microseconds (μs) to be performed. In other implementations, VR beamforming procedure 810 has a different duration. In one implementation, a divorced beacon 815 is sent at the end of the VR beamforming procedure 810. As used herein, the term "beacon" is defined as a transmission that is sent to keep two or more devices synchronized. The "divorced beacon" is divorced from the blanking interval in the sense that the timing of the transmission of the beacon is dependent on when the VR beamforming procedure 810 completes. After the beamforming procedure 810 is complete, the preferred transmit sector and the preferred receive sector are known and used to send divorced beacon 815 and then wireless frames 820.

In one implementation, a single divorced beacon 815 is sent on the preferred transmit sector by the transmitter and received on the preferred receive sector by the receiver. The expectation is that the receiver will receive the single beacon with a high probability since the preferred (i.e., best) transmit and receive sectors have already been determined, increasing the probability that the beacon will be received. The beacons 815 and 835 that are sent are used to calibrate timing from the transmitter to the receiver, allowing the transmitter and the receiver to synchronize their clocks. After wireless frames 820 are sent, another blanking interval 825 occurs, with a VR beamforming procedure 830 taking place during blanking interval 825. At the completion of VR beamforming procedure 830, a divorced beacon 835 is sent. Then more wireless frames can be sent followed by another blanking interval. This pattern can be repeated on a periodic basis.

Figure 9:
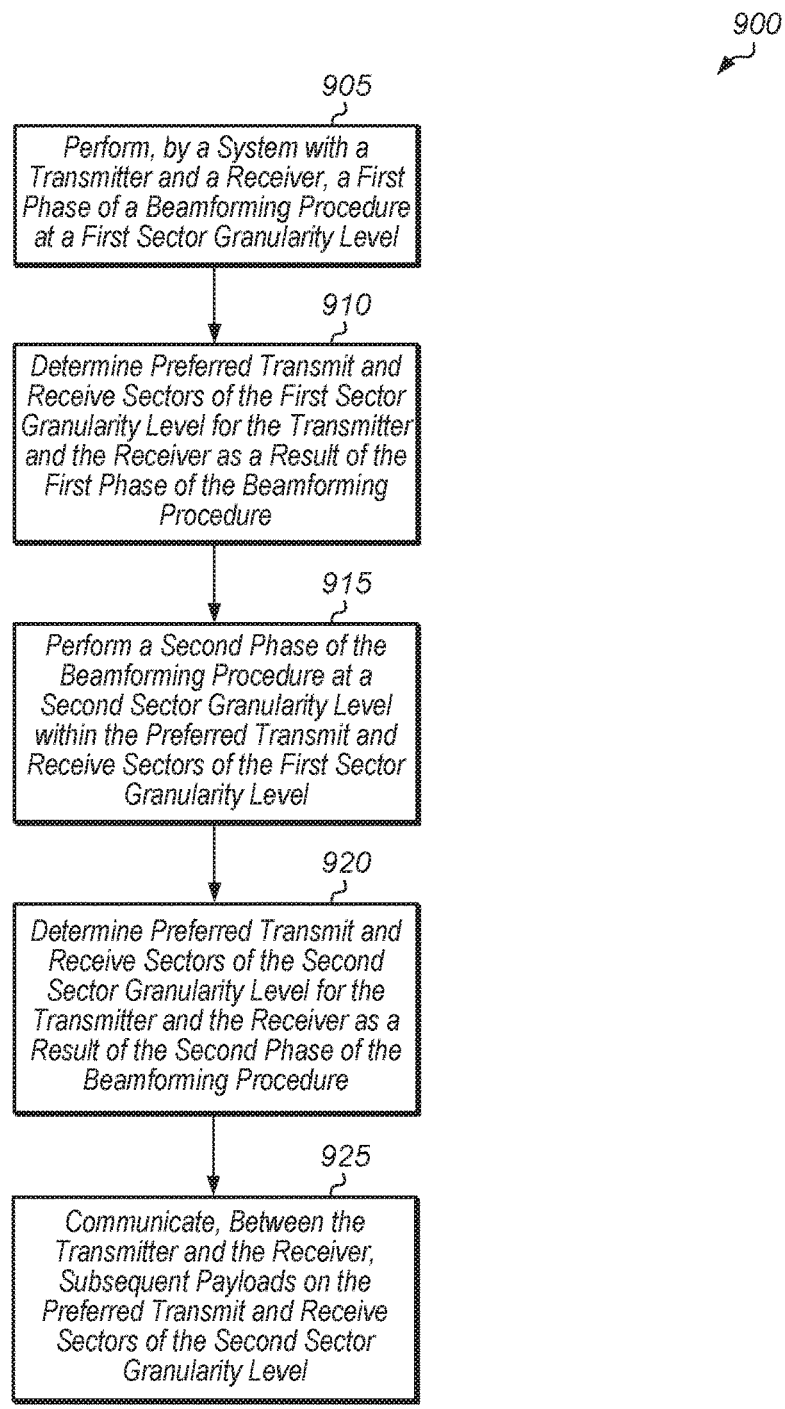
FIG. 9 is a generalized flow diagram illustrating one implementation of a method for implementing a beamforming procedure.
Figure 10:
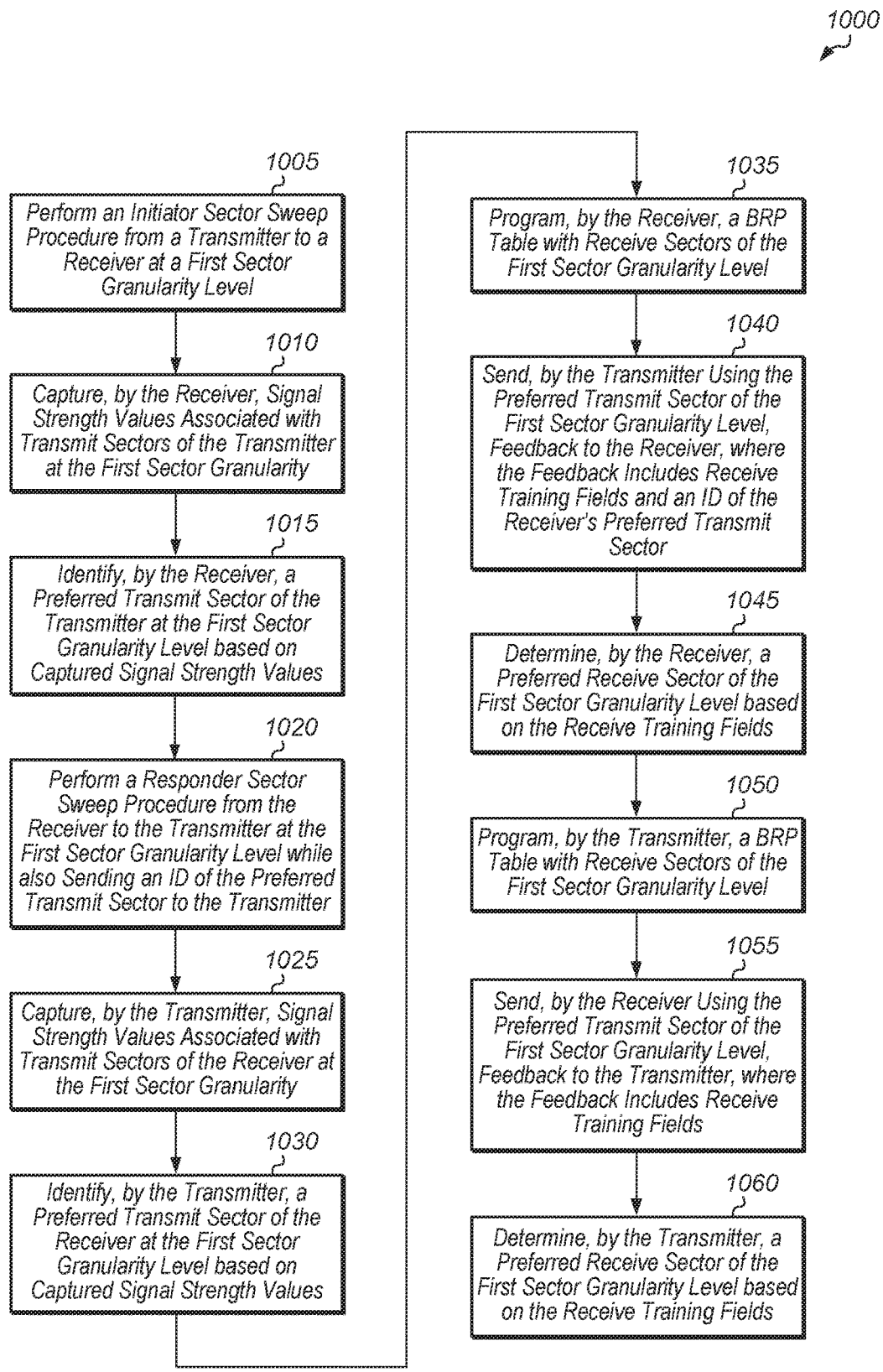
FIG. 10 is a generalized flow diagram illustrating one implementation of a method for performing a first phase of a beamforming procedure at a first sector granularity level.
Figure 11:
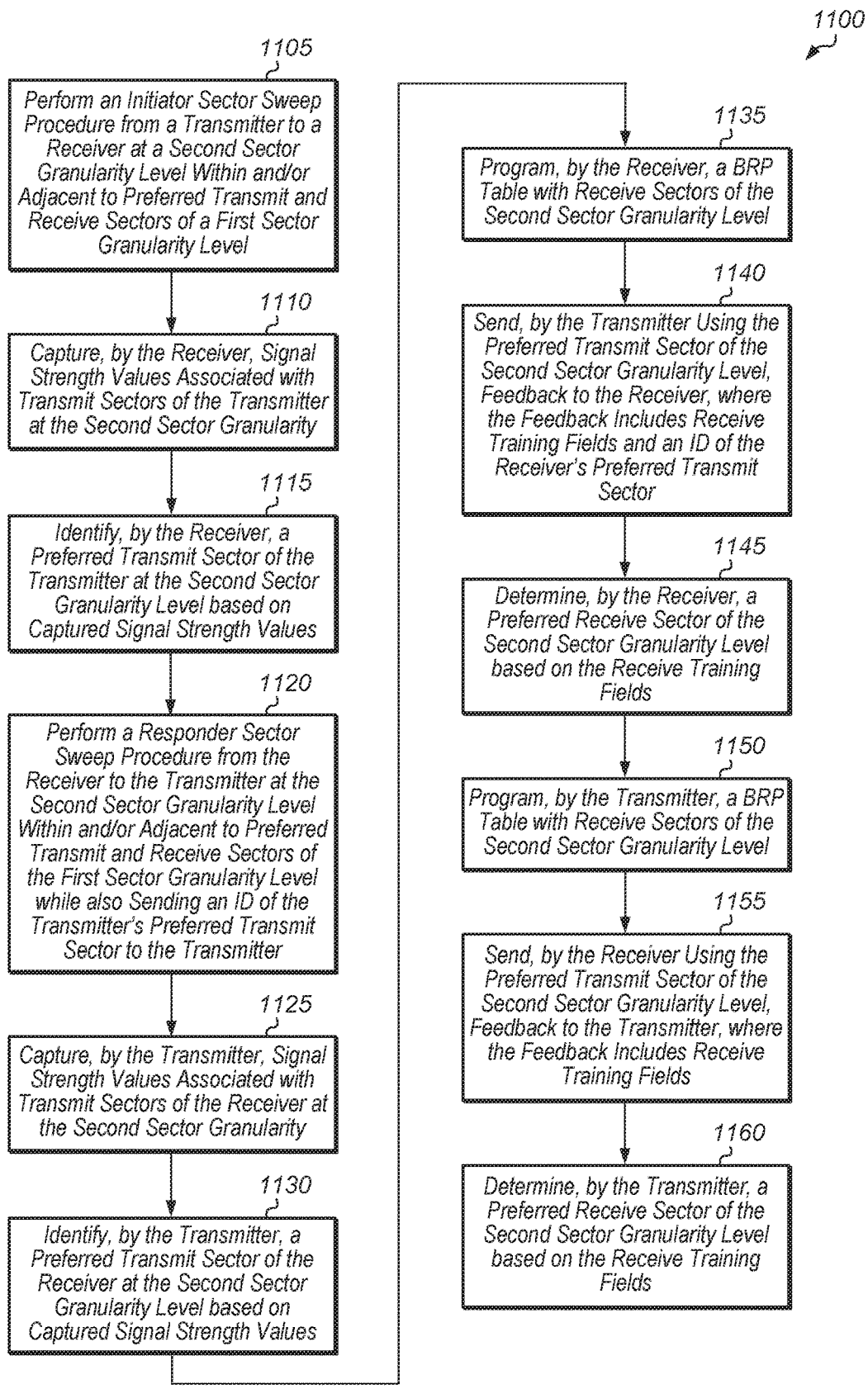
FIG. 11 is a generalized flow diagram illustrating one implementation of a method for performing a second phase of a beamforming procedure at a second sector granularity level.

Referring now to FIG. 9, one implementation of a method 900 for implementing a beamforming procedure is shown. For purposes of discussion, the steps in this implementation and those of FIG. 10-11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900.

A system with a transmitter and a receiver performs a first phase of a beamforming procedure at a first sector granularity level (block 905). One example of performing a first phase of a beamforming procedure at a first sector granularity level is described in further detail below in the discussion associated with method 1000 (of FIG. 10). In one implementation, the system implements a wireless VR application. For example, in this implementation, the transmitter includes a GPU and the receiver is a HMD. In other implementations, the system implements other types of applications and/or the transmitter and receiver are other devices. Next, the system determines preferred transmit and receive sectors of the first sector granularity level for the transmitter and the receiver as a result of the first phase of the beamforming procedure (block 910). It is noted that the "first phase" of the beamforming procedure can also be referred to herein as a "wide phase" of the beamforming procedure.

Then, the system performs a second phase of the beamforming procedure at a second sector granularity level within the preferred transmit and receive sectors of the first sector granularity level (block 915). One example of performing the second phase of the beamforming procedure at a second sector granularity level is described in further detail below in the discussion associated with method 1100 (of FIG. 11). It is assumed for the purposes of this discussion that sectors of the first sector granularity level are larger than sectors of the second sector granularity level. For example, in one implementation, there are 8 "wide" sectors of the first sector granularity level and 64 "narrow" sectors of the second sector granularity level. It is noted that in some cases, the system performs the second phase of the beamforming procedure at the second sector granularity level within the preferred transmit and receive sectors and for sectors which are adjacent to the preferred transmit and receive sectors. It is also noted that the "second phase" of the beamforming procedure can also be referred to herein as a "narrow phase" of the beamforming procedure.

Next, the system determines preferred transmit and receive sectors of the second sector granularity level for the transmitter and the receiver as a result of the second phase of the beamforming procedure (block 920). Then, the system communicates, between the transmitter and the receiver, subsequent data on the preferred transmit and receive sectors of the second sector granularity level (block 925). After block 925, method 900 ends. In one implementation, the system performs method 900 on a periodic basis to update the preferred transmit and receive sectors of the second sector granularity level for sending and receiving wireless data.

Turning now to FIG. 10, one implementation of a method 1000 for performing a first phase of a beamforming procedure at a first sector granularity level is shown. A system performs an initiator sector sweep procedure from a transmitter to a receiver at a first sector granularity level (block 1005). The first sector granularity level can also be referred to herein as a wide sector level. During the initiator sector sweep procedure, the receiver captures signal strength values associated with transmit sectors of the transmitter at the first sector granularity level (block 1010). Then, the receiver identifies a preferred transmit sector of the transmitter at the first sector granularity level based on captured signal strength values (block 1015). For example, in one implementation, the receiver determines from which transmit sector the data with the highest signal strength was received (as compared to the signal strengths of other received data), and then the receiver designates this transmit sector of the transmitter as the preferred transmit sector.

Next, the system performs a responder sector sweep procedure from the receiver to the transmitter at the first sector granularity level while also sending an identifier (ID) of the preferred transmit sector to the transmitter (block 1020). For example, in one implementation, the receiver sends an ID of the transmitter's preferred transmit sector within the data of the responder sector sweep procedure. During the responder sector sweep procedure, the transmitter captures signal strength values associated with transmit sectors of the receiver at the first sector granularity level (block 1025). Then, the transmitter identifies a preferred transmit sector of the receiver at the first sector granularity level based on captured signal strength values (block 1030).

Next, the receiver programs a beam refinement protocol (BRP) table with receive sectors of the first sector granularity level (block 1035). Then, the transmitter sends, using the preferred transmit sector of the first sector granularity level, feedback to the receiver, where the feedback includes receive training fields and an ID of the receiver's preferred transmit sector (block 1040). The receive training fields are used by the receiver to determine a preferred receive sector of the first sector granularity level (block 1045).

Next, the transmitter programs a BRP table with receive sectors of the first sector granularity level (block 1050). Then, the receiver sends, using the preferred transmit sector of the first sector granularity level, feedback to the transmitter, where the feedback includes receive training fields (block 1055). The receive training fields are used by the transmitter to determine a preferred receive sector of the first sector granularity level (block 1060). After block 1060, method 1000 ends. In one implementation, method 1000 is performed as block 910 of method 900 (of FIG. 9).

Referring now to FIG. 11, one implementation of a method 1100 for performing a second phase of a beamforming procedure at a second sector granularity level is shown. A system performs an initiator sector sweep procedure from the transmitter to the receiver at a second sector granularity level within and/or adjacent to preferred transmit and receive sectors of a first sector granularity level (block 1105). The second sector granularity level can also be referred to herein as a narrow sector level. During the initiator sector sweep procedure, the receiver captures signal strength values associated with transmit sectors of the second sector granularity level of the transmitter (block 1110). Then, the receiver identifies a preferred transmit sector at the second sector granularity level of the transmitter based on captured signal strength values (block 1115). For example, in one implementation, the receiver extracts a transmit sector ID from each received data to identify which transmit sector generated each data. Also, the receiver determines which data was received with the highest signal strength compared to the signal strengths of the other received data, and then the receiver identifies the transmit sector of the transmitter that sent this data with the highest signal strength as the preferred transmit sector.

Next, the system performs a responder sector sweep procedure from the receiver to the transmitter at the second sector granularity level within and/or adjacent to preferred transmit and receive sectors of the first sector granularity level while also sending an ID of the transmitter's preferred transmit sector to the transmitter (block 1120). During the responder sector sweep procedure, the transmitter captures signal strength values associated with transmit sectors of the second sector granularity level of the receiver (block 1125). Then, the transmitter identifies a preferred transmit sector of the receiver at the second sector granularity level based on captured signal strength values (block 1130).

Next, the receiver programs a BRP table with receive sectors of the second sector granularity level (block 1135). Then, the transmitter sends, using the preferred transmit sector of the second sector granularity level, feedback to the receiver, where the feedback includes receive training fields and an ID of the receiver's preferred transmit sector (block 1140). The receive training fields are used by the receiver to determine a preferred receive sector of the second sector granularity level (block 1145).

Next, the transmitter programs a BRP table with receive sectors of the second sector granularity level (block 1150). Then, the receiver sends, using the preferred transmit sector of the second sector granularity level, feedback to the transmitter, where the feedback includes receive training fields (block 1155). The receive training fields are used by the transmitter to determine a preferred receive sector of the second sector granularity level (block 1160). After block 1160, method 1100 ends. In one implementation, method 1100 is performed as block 920 of method 900 (of FIG. 9).

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used.

In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a processor; and
    a transceiver;
    wherein the processor is configured to:
        perform a first phase of a beamforming procedure at a first sector granularity level a plurality of times to identify a preferred receive antenna of multiple receive antennas, wherein each beamforming procedure is followed by an interframe spacing interval;
        after the preferred receive antenna is identified, determine a first preferred transmit sector for use by the transceiver based on the first phase of the beamforming procedure;
        perform a second phase of the beamforming procedure at a second sector granularity level within the preferred transmit sector of the first sector granularity level, wherein the second sector granularity level is of finer granularity than the first sector granularity level;
        determine a second preferred transmit sector for use by the transceiver based on the second phase of the beamforming procedure, wherein the second preferred transmit sector is narrower than the first preferred transmit sector; and
        convey, via the transceiver, data via the second preferred transmit sector.

2. The apparatus as recited in claim 1, wherein the preferred receive antenna is an omnidirectional antenna, and wherein to perform the first phase of the beamforming procedure at the first sector granularity level, the processor is configured to:
    perform an initiator sector sweep procedure at the first sector granularity level;
    receive, via the transceiver, an identifier (ID) of the first preferred transmit sector; and
    send, via the transceiver on the first preferred transmit sector, feedback comprising first receive training fields, wherein the first receive training fields are used by a receiver to train receive sectors at the first sector granularity level.

3. The apparatus as recited in claim 2, wherein to perform the first phase of the beamforming procedure at the first sector granularity level, the processor is further configured to:
    program a beam refinement protocol (BRP) table with receive sectors at the first sector granularity level in anticipation of receiving second receive training fields;
    receive, via the transceiver, feedback comprising the second receive training fields; and
    determine a first preferred receive sector at the first sector granularity level based on the second receive training fields.

4. The apparatus as recited in claim 3, wherein to perform the second phase of the beamforming procedure at the second sector granularity level, the processor is configured to:
    perform an initiator sector sweep procedure at the second sector granularity level within and adjacent to the first preferred transmit sector;
    receive, via the transceiver during a responder sector sweep procedure, an ID of the second preferred transmit sector;
    send, via the transceiver on the second preferred transmit sector, feedback comprising third receive training fields;
    program the BRP table with receive sectors at the second sector granularity level in anticipation of receiving fourth receive training fields;
    receive, via the transceiver, feedback comprising the fourth receive training fields; and
    determine a second preferred receive sector at the second sector granularity level based on the fourth receive training fields.

5. The apparatus as recited in claim 1, wherein the processor is further configured to:
    determine a first preferred receive sector at the first sector granularity level as a result of the first phase of the beamforming procedure; and
    determine a second preferred receive sector at the second sector granularity level as a result of the second phase of the beamforming procedure.

6. The apparatus as recited in claim 1, wherein the processor is further configured to send a divorced beacon on the second preferred transmit sector subsequent to performing the second phase of the beamforming procedure, wherein timing of transmission of the divorced beacon is dependent on when the second phase of the beamforming procedure completes.

7. The apparatus as recited in claim 1, wherein the processor is further configured to perform the first phase of the beamforming procedure multiple times separated by an interframe spacing interval to allow a receiver to find a preferred radio frequency (RF) antenna of multiple RF antennas at the receiver.

8. A method comprising:
    performing a first phase of a beamforming procedure at a first sector granularity level a plurality of times to identify a preferred receive antenna of multiple receive antennas, wherein each beamforming procedure is followed by an interframe spacing interval;
    after the preferred receive antenna is identified, determining a first preferred transmit sector for use by a transceiver based on the first phase of the beamforming procedure;

performing a second phase of the beamforming procedure at a second sector granularity level within the preferred transmit sector of the first sector granularity level, wherein the second sector granularity level is of finer granularity than the first sector granularity level;

determining a second preferred transmit sector for use by the transceiver based on the second phase of the beamforming procedure, wherein the second preferred transmit sector is narrower than the first preferred transmit sector; and conveying, via the transceiver, data via the second preferred transmit sector.

9. The method as recited in claim 8, wherein the preferred receive antenna is an omnidirectional antenna, and wherein performing the first phase of the beamforming procedure at the first sector granularity level comprises:

performing an initiator sector sweep procedure at the first sector granularity level;

receiving, via the transceiver, an identifier (ID) of the first preferred transmit sector; and sending, via the transceiver on the first preferred transmit sector, feedback comprising first receive training fields, wherein the first receive training fields are used by a receiver to train receive sectors at the first sector granularity level.

10. The method as recited in claim 9, wherein performing the first phase of the beamforming procedure at the first sector granularity level further comprises:

programming a beam refinement protocol (BRP) table with receive sectors at the first sector granularity level in anticipation of receiving second receive training fields;

receiving, via the transceiver, feedback comprising the second receive training fields;

determining a first preferred receive sector at the first sector granularity level based on the second receive training fields.

11. The method as recited in claim 10, wherein performing the second phase of the beamforming procedure at the second sector granularity level comprises:

performing an initiator sector sweep procedure at the second sector granularity level within and adjacent to the first preferred transmit sector;

receiving, via the transceiver during a responder sector sweep procedure, an ID of the second preferred transmit sector;

sending, via the transceiver on the second preferred transmit sector, feedback comprising third receive training fields;

programming the BRP table with receive sectors at the second sector granularity level in anticipation of receiving fourth receive training fields;

receiving, via the transceiver, feedback comprising the fourth receive training fields; and determining a second preferred receive sector at the second sector granularity level based on the fourth receive training fields.

12. The method as recited in claim 8, further comprising:

determining a first preferred receive sector at the first sector granularity level as a result of the first phase of the beamforming procedure; and determining a second preferred receive sector at the second sector granularity level as a result of the second phase of the beamforming procedure.

13. The method as recited in claim 12, further comprising sending a divorced beacon on the second preferred transmit sector subsequent to performing the second phase of the beamforming procedure, wherein timing of transmission of the divorced beacon is dependent on when the second phase of the beamforming procedure completes.

14. The method as recited in claim 8, further comprising performing the first phase of the beamforming procedure multiple times separated by an interframe spacing interval to allow a receiver to find a preferred radio frequency (RF) antenna of multiple RF antennas at the receiver.

15. A system comprising:

a transmitter; and a receiver;

wherein the system is configured to:

perform a first phase of a beamforming procedure at a first sector granularity level a plurality of times to identify a preferred receive antenna of multiple receive antennas, wherein each beamforming procedure is followed by an interframe spacing interval;

after the preferred receive antenna is identified, determine preferred transmit and receive sectors of the first sector granularity level for the transmitter and the receiver as a result of the first phase of the beamforming procedure;

perform a second phase of the beamforming procedure at a second sector granularity level within the preferred transmit and receive sectors of the first sector granularity level, wherein the second sector granularity level is of finer granularity than the first sector granularity level;

determine preferred transmit and receive sectors of the second sector granularity level for the transmitter and the receiver as a result of the second phase of the beamforming procedure, wherein the second preferred transmit sector is narrower than the first preferred transmit sector; and communicate, between the transmitter and the receiver, subsequent data on the preferred transmit and receive sectors of the second sector granularity level, wherein the subsequent data comprises pixel data to be displayed.

16. The system as recited in claim 15, wherein the preferred receive antenna is an omnidirectional antenna, and wherein performing the first phase of the beamforming procedure at the first sector granularity level comprises:

performing an initiator sector sweep procedure from the transmitter to the receiver at the first sector granularity level;

identifying, by the receiver, a preferred transmit sector at the first sector granularity level of the transmitter based on captured signal strength values associated with transmit sectors; and performing a responder sector sweep procedure from the receiver to the transmitter at the first sector granularity level while also sending an identifier (ID) of the preferred transmit sector of the transmitter.

17. The system as recited in claim 16, wherein performing the first phase of the beamforming procedure at the first sector granularity level further comprises:

identifying, by the transmitter, a preferred transmit sector at the first sector granularity level of the receiver based on captured signal strength values associated with transmit sectors;

programming, by the receiver, a first beam refinement protocol (BRP) table with receive sectors of the first sector granularity level in anticipation of receiving first receive training fields;

sending, on the preferred transmit sector at the first sector granularity level of the transmitter, feedback to the receiver, wherein the feedback comprises the first receive training fields and an ID of the preferred transmit sector of the receiver;

determining, by the receiver, a preferred receive sector of the first sector granularity level based on the first receive training fields;

programming, by the transmitter, a second BRP table with receive sectors of the first sector granularity level in anticipation of receiving second receive training fields;

sending, on the preferred transmit sector at the first sector granularity level of the receiver, feedback to the transmitter, wherein the feedback comprises the second receive training fields; and determining, by the transmitter, a preferred receive sector of the first sector granularity level based on the second receive training fields.

18. The system as recited in claim 17, wherein performing the second phase of the beamforming procedure at the second sector granularity level comprises:

performing an initiator sector sweep procedure from the transmitter to the receiver at the second sector granularity level within preferred transmit and receive sectors of the first sector granularity level;

identifying, by the receiver, a preferred transmit sector at the second sector granularity level of the transmitter based on captured signal strength values associated with transmit sectors; and performing a responder sector sweep procedure from the receiver to the transmitter at the second sector granularity level within preferred transmit and receive sectors of the first sector granularity level while also sending an identifier (ID) of the preferred transmit sector of the transmitter.

19. The system as recited in claim 18, wherein performing the second phase of the beamforming procedure at the second sector granularity level further comprises:

identifying, by the transmitter, a preferred transmit sector at the second sector granularity level of the receiver based on captured signal strength values associated with transmit sectors;

programming, by the receiver, the first BRP table with receive sectors of the second sector granularity level in anticipation of receiving third receive training fields;

sending, on the preferred transmit sector at the second sector granularity level of the transmitter, feedback to the receiver, wherein the feedback comprises the third receive training fields and an ID of the preferred transmit sector of the receiver;

determining, by the receiver, a preferred receive sector of the second sector granularity level based on the third receive training fields;

programming, by the transmitter, the second BRP table with receive sectors of the second sector granularity level in anticipation of receiving fourth receive training fields;

sending, on the preferred transmit sector at the second sector granularity level of the receiver, feedback to the transmitter, wherein the feedback comprises the fourth receive training fields; and determining, by the transmitter, a preferred receive sector of the second sector granularity level based on the fourth receive training fields.

20. The system as recited in claim 19, wherein the system is configured to perform the initiator sector sweep procedure from the transmitter to the receiver for sectors of the second sector granularity level that are within and adjacent to preferred transmit and receive sectors of the first sector granularity level.

\* \* \* \* \*